3,556,845
HEATING MEANS FOR CONTINUOUS
CRYSTALLIZING VESSELS
Francis Dambrine, Marcq-en-Baroeul, and Jean Claude Giorgi, Hellemmes, France, assignors to Fives Lille-Cail, Paris, France
Filed May 12, 1969, Ser. No. 823,625
Claims priority, application France, May 10, 1968, 151,268
Int. Cl. C13f 1/02; B01d 1/04; F28f 3/12
U.S. Cl. 127—16                              4 Claims

ABSTRACT OF THE DISCLOSURE

A group of vertically disposed horizontally elongated hollow heating plates disposed in the bottom portion of a horizontally elongated vessel which has an end wall provided with a steam chest and with condensation collecting means. Each hollow heating plate is partitioned to form an upper compartment in communication with the steam chest and a lower compartment in communication with the condensation collecting means, the two compartments being connected by a passage in the end portion of the heating plate remote from the end wall of the vessel, so that steam flowing through the upper compartment may assist in moving condensation in the lower compartment to the collecting means. A condensation collecting trough is provided in the lower compartment, in upwardly spaced relation from the bottom of the latter.

---

Figure 1:
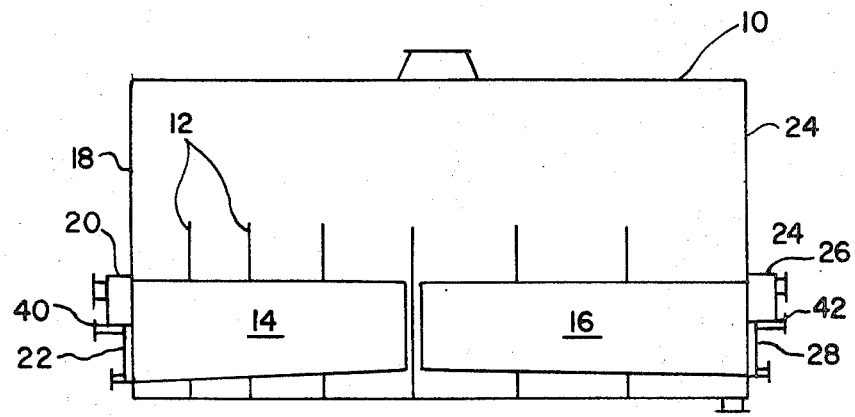

This invention relates to new and useful improvements in apparatus for continuous crystallizing of sugar and the like, and more particularly the invention concerns itself with apparatus of this type wherein the crystallizing process is carried out in a horizontally elongated vessel by the action of heating means consisting of groups of hollow heating plates disposed in the bottom portion of the vessel.

In accordance with conventional practice steam is supplied to the hollow heating plates from a steam chest on the end wall of the vessel and means are also provided for draining or collecting condensation from the plates. The heating plates are vertically disposed and horizontally elongated, extending inwardly from the vessel end wall equipped with the steam chest, and the condensation collecting means may be located either at the same end of the plates as the steam chest, or at the opposite, inner end.

When in conventional practice the steam supply and the condensation collecting means are located at the same end of the hollow heating plates, the steam and the condensed water must necessarily flow in opposite directions within the hollow plates, and although it is customary to slope the bottom of the plates in order to facilitate drainage of the condensation to the collecting means, such drainage is hampered by the flow of steam in the opposite direction. Thus, the condensation has a tendency to remain in the bottom portion of the heating plates, thus keeping the same at low temperature which causes crystallizing on the outside of the plates and requires frequent stopping of the continuous process in order to clean the heating plates of deposited crystals.

It is also conventional in the art to provide crystallizing vessels of considerable length wherein it is not practical to utilize a single group of heating plates extending the full length of the vessel, and thus it has become customary to utilize two groups of heating plates extending inwardly from the opposite end walls of the vessel, with each group of plates having its own steam chest and condensation collecting means. Here again, if the steam chest and the condensation collecting means for each group of heating plates are located at the same end of the vessel, the problems encountered are the same as those above outlined. On the other hand, if each group of heating plates has a steam chest at one end thereof and condensation collecting means at the other or opposite end, the drainage of condensation is facilitated by the flow of steam in the same direction, but another difficulty is encountered in that the condensation collecting means are disposed in the central portion of the vessel at the inner ends of the groups of heating plates and the relatively low temperatures of the condensation collecting means again causes formation of crystals thereon, thus also necessitating frequent interruption of the process for purposes of cleaning.

It is, therefore, the principal object of this invention to eliminate the above outlined disadvantages of conventional apparatus and to provide improved heating plates which receive their supply of steam and discharge their condensation at the same end of the crystallizing vessel, but which are characterized in that their interior is separated into upper and lower compartments for the inlet of steam and discharge of condensation respectively, in a manner whereby the steam flow does not resist, but actually assists the drainage of condensation.

Figure 2:
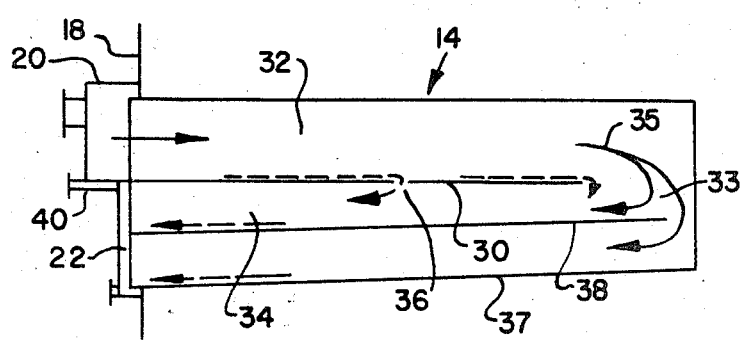

With the foregoing more important object and features in view, the invention will be understood from the following description taken in conjunction with the accompanying drawings, wherein like characters of reference are used to designate like parts, and wherein:

FIG. 1 is a schematic view in longitudinal section of the crystallizing apparatus; and FIG. 2 is a schematic longitudinal sectional view of one of the improved heating plates.

Referring now to the accompanying drawings in detail, FIG. 1 shows the general characteristics of the crystallizing apparatus which, apart from the hereinafter described details of the heating plates, is conventional in nature and consists of a horizontally elongated cylindrical vessel 10 which has its interior divided into a plurality of compartments by transverse partitions 12 disposed in the bottom portion of the vessel at longitudinally spaced intervals.

The vessel 10 is provided with two groups of heating plates 14, 16, disposed in longitudinal alignment in the bottom portion of the vessel and extending inwardly from the respective end walls 18, 24 of the vessel toward the longitudinal center through suitable slots (not shown) which are formed in the partitions 12. The head end or outer end of the group of plates 14 communicates with a steam chest 20 disposed exteriorly on the vessel end wall 18, and also with condensation collecting means 22 provided on the end wall 18 below the steam chest 20. Similarly, the head or outer end of the group of heating plates 16 communicates with a steam chest 26 and with condensation collecting means 28 on the end wall 24 of the vessel, as will be readily apparent. The condensation collecting means 22, 28 are equipped with suitable outlets 40, 42, respectively, for drawing off steam which does not condense during its passage through the apparatus.

The invention resides in the particular, improved structural arrangement of the heating plates 14, 16, one of which exemplified at 14 is illustrated in detail in FIG. 2. The plates 14, 16 are hollow, vertically disposed and horizontally elongated in the vessel 10, and the hollow interior of each plate, as for example the plate 14 in FIG. 2, is separated by a substantially horizontal partition 30 into an upper compartment 32 and a lower compartment 34. The upper compartment 32 communicates with the steam chest 20 (or 26 in the instance of the plates 16), while the lower compartment 34 communicates with the condensation collecting means 22 (or 28 in the instance of the plates 16). The partition 30 is somewhat shorter than the longitudinal dimension of the heating plate so that a passage 33 is provided in the inner end portion of the plate for connecting the compartments 32, 34 together, thus permitting steam to flow from the upper compartment into the lower compartment, as indicated by the arrows 35.

The partition 30 may be horizontal, or it may have a degree of slope toward the passage 33 so that any steam which may condense on the partition may gravitate as water to drain through the passage 33 into the lower compartment 34, it being noted that such drainage of water along the partition 30 toward the passage 33 is assisted by the flow of steam through the compartment 32 in the same direction. Also, to facilitate such drainage of condensed steam, the partition 30 may be provided at a point intermediate of its length with an orifice 36, through which water may drain into the lower compartment 34 without materially affecting the steam supply in the upper compartment 32, it being noted that drainage through the orifice 36 occurs well in advance of drainage of condensation through the end passage 33.

The water draining into the lower compartment 34 is discharged through the condensation collecting means 22 (or 28), while any still remaining steam may be drawn off through the outlet 40 (or 42). It is to be particularly noted that the separation of the interior of the heating plate by the partition 30 into the upper and lower compartments 32, 34, respectively, causes both the steam and the condensation to flow in the same direction in each compartment, that is, first inwardly in the upper compartment 32 and then outwardly in the lower compartment 34, so that at all times the steam flow actively assists in moving the condensation to its ultimate disposal point at the collecting means 22 (or 28).

As another important feature of the invention, a condensation collecting trough 38 is provided in the plates 14, 16 in upwardly spaced relation from the bottom of each plate and downwardly spaced relation from the partition 30. Like the bottom 37 of the plate, the trough 38 may be sloped toward the collecting means 22 in order to afford effective drainage of condensation under the assistance of the steam flow, as already mentioned.

The trough 38 is also shorter than the heating plate but is somewhat longer than the partition 30 so that it projects under the passage 33 in a manner which causes flow of steam from the upper compartment 32 through the passage 33 to be divided as shown by the arrows 35, with steam thus flowing both above and below the trough 38. As a result, highly efficient heat exchange is obtained in terms of heating the material in the vessel 10, and the division of flow of steam in the lower compartment 34, as afforded by the provision of the trough 38, assures that condensation takes place in an effective manner which facilitates rapid removal of the condensed water to its collecting means 22 (or 28) with the assistance of the steam flow, so that the condensed water does not remain in the heating plate for any length of time such as would cause unduly low temperatures and undesirable formation of crystals at the outside of the plate. This is particularly true in view of the fact that the collecting trough 38 permits condensation to occur in two separate areas, that is, on the trough itself and on the bottom 37 of the plate, thus producing two currents of condensation at two different levels, with the drainage of both being assisted by the steam flow moving in the same direction, as already noted. Conveniently, drainage of condensation through the afore-mentioned orifice 36 in the partition 30 drops onto the through 38 in advance of condensation drainage through the passage 33, and thus the condensation drainage through the orifice 36 has a shorter path to travel before reaching the collecting means 22.

If desired, additional troughs such as the trough 38 may be provided in the lower compartment 34 to separate the same into more than two levels, and also, such troughs may be provided in the upper compartment 32, if so desired. It will be also apparent that while the invention has been described in terms of a continuous crystallizing apparatus, it is equally applicable to a discontinuous or "batch" process.

What is claimed as new is:

1. In a continuous crystallizing apparatus for sugar and the like, the combination of a horizontally elongated vessel including an end wall, and heating means comprising a group of vertically disposed horizontally elongated hollow heating plates extending longitudinally from said end wall in the bottom portion of said vessel, each of said heating plates having a head end at said end wall and an inner end, a substantially horizontal partition provided in each heating plate and separating the interior thereof into an upper compartment and a lower compartment, said partition being shorter than the heating plate to provide a passage in the inner end portion of the plate connecting said upper and lower compartments together, a steam chest provided exteriorly on said end wall in communication with said upper compartment, and condensation collecting means provided on said end wall below said steam chest in communication with said lower compartment, whereby steam flowing from the upper compartment through said passage into the lower compartment may assist in moving condensation to said collecting means.

2. The apparatus as defined in claim 1 wherein said partition is provided at an intermediate point along its length with an orifice for delivering condensation into said lower compartment.

3. The apparatus as defined in claim 1 together with a condensation collecting trough extending longitudinally in said lower compartment in upwardly spaced relation from the bottom of the lower compartment and in downwardly spaced relation from said partition, said trough being shorter than the heating plate but longer than the partition whereby said trough extends under said passage.

4. The apparatus as defined in claim 3 wherein said partition is provided at an intermediate point along its length with an orifice for delivering condensation to said trough.

References Cited

UNITED STATES PATENTS

| 2,057,416 | 10/1936 | Castellazzi | 165—110X |
| 2,991,978 | 7/1961 | Jones | 165—110X |

FOREIGN PATENTS

| 215,110 | 10/1964 | Sweden | 165—132 |
| 1,358,472 | 3/1964 | France | 127—16 |

JOSEPH SCOVRONEK, Primary Examiner

D. G. CONLIN, Assistant Examiner

U.S. Cl. X.R.

127—15; 159—28; 165—110